(No Model.) 6 Sheets—Sheet 1.

J. A. & G. M. BRILL.
COMBINATION OPEN AND CLOSED CAR.

No. 493,013. Patented Mar. 7, 1893.

Fig. 1.

Attest:
C. W. Benjamin
H. F. Durber

Inventors,
John A. Brill,
George M. Brill.
by Joseph L. Levy
atty.

(No Model.) 6 Sheets—Sheet 2.

J. A. & G. M. BRILL.
COMBINATION OPEN AND CLOSED CAR.

No. 493,013. Patented Mar. 7, 1893.

Fig. 2.

Attest:
C. W. Benjamin.
H. F. Durbin.

Inventors:
John A. Brill.
George M. Brill.
by Joseph L. Levy
atty.

(No Model.) 6 Sheets—Sheet 3.
J. A. & G. M. BRILL.
COMBINATION OPEN AND CLOSED CAR.
No. 493,013. Patented Mar. 7, 1893.

Attest;
W. M. Benjamin.
H. F. Dunbar.

Inventors;
John A. Brill.
George M. Brill.
by Joseph L. Levy
atty (No Model.) 6 Sheets—Sheet 5.

J. A. & G. M. BRILL.
COMBINATION OPEN AND CLOSED CAR.

No. 493,013. Patented Mar. 7, 1893.

Attest:
C. W. Benjamin
H. F. Dunbar

Inventors
John A. Brill
George M. Brill
by Joseph L. Levy
atty.

UNITED STATES PATENT OFFICE.

JOHN A. BRILL AND GEORGE MARTIN BRILL, OF PHILADELPHIA, PENNSYLVANIA.

COMBINATION OPEN AND CLOSED CAR.

SPECIFICATION forming part of Letters Patent No. 493,013, dated March 7, 1893.

Application filed June 30, 1892. Serial No. 438,510. (No model.)

*To all whom it may concern:*

Be it known that we, JOHN A. BRILL and GEORGE MARTIN BRILL, citizens of the United States, residing at Philadelphia, in the county of Philadelphia and State of Pennsylvania, have made a new and useful Combination Open and Closed Car for Street-Railways, of which the following is a specification.

The object of our invention is to enable railroad companies operating street cars to change a car from an open to a closed one to adapt it for either summer or winter use; and our invention in this regard consists of making the entire side of the car, in which may be located the panel work and windows, readily detachable and attachable, so that a car which has just been used as an open car can be quickly and economically changed for use as a closed car, or, vice versa, with side windows and panel work in place.

Another part of our present invention relates to the bracing for the side rails of the roof platform, which is adapted to securely brace the rails which surround the sides of the platform at the top of the car.

Another portion of our invention consists in securing a drip board to the sides of the car under the roof platform and above the windows or line of the side opening therein.

Still another portion of our invention consists in the arrangement of a curtain for closing the sides of the car when the same is used as a summer car, at which time the sides are open.

Our invention further consists in the details of structure shown and described herein, and pointed out in the claims.

In the drawings.

Same numerals of reference refer to like parts throughout the several views.

Figure 1:
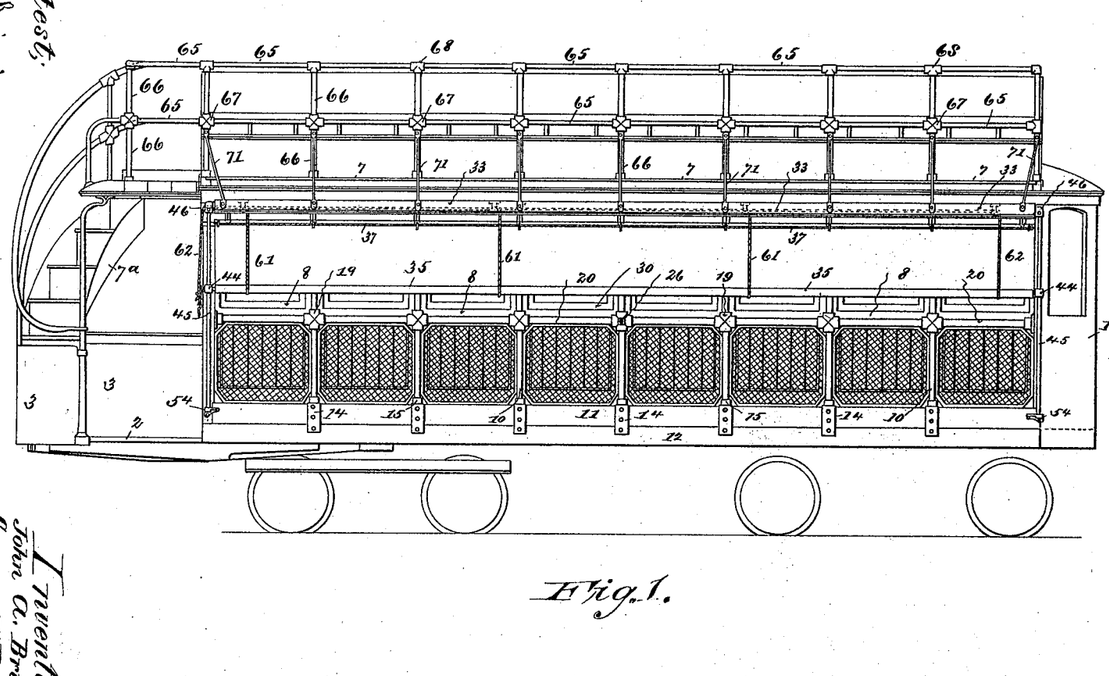
Figure 1, is a side elevation of the tram car of the type known as "double deckers," having the inclosed roof, an inclosed end or platform, and a stair-way leading from the open end or platform to the roof.

The car to which we have shown the various portions of our invention as being applied, is of that class known as double deckers, the front end of which is in this case closed by a compartment 1 for the motor or grip man, and which is designed to be run with this end forward. The rear end of the car is provided with a platform 2, which is partially inclosed by a dash board 3, which incloses said platform except on the side which is used to take in passengers, they being taken in at that side only. In this particular car the seats are arranged to face the sides of the car and extend centrally there-through, and are arranged back to back, as shown in dotted lines, Fig. 2, leaving a longitudinal aisle in each side of the car between the seats and the sides thereof, to which access is had by means of two door-ways 4 in front of the aisles, between which an end panel 5 is secured, which abuts against the ends of the seats, and which may be provided with windows 6. A door may be provided to slide against the panel 5 to open or close the door-ways 4. The roof of the car is provided with a platform 7, and access to the same is had by means of a stair way $7^a$ leading up from the platform.

So far as the detachable side is concerned, it may be applied to a car of the construction wherein the seats run transversely of the car and abut against the sides thereof, and which has platforms at both ends with or without door-ways opening onto the platforms; or in cars wherein access to the seats is had from the sides, which may or may not be provided with platforms. The only essential features which are requisite for the accomplishment of this part of our invention, are that there should be a car body, and means for gaining access to the interior thereof, with sides which are adapted to be rendered open or closed in pursuance of this part of our invention. Neither is it necessary that there should be an upper deck, nor means for gaining access thereto.

Figure 2:
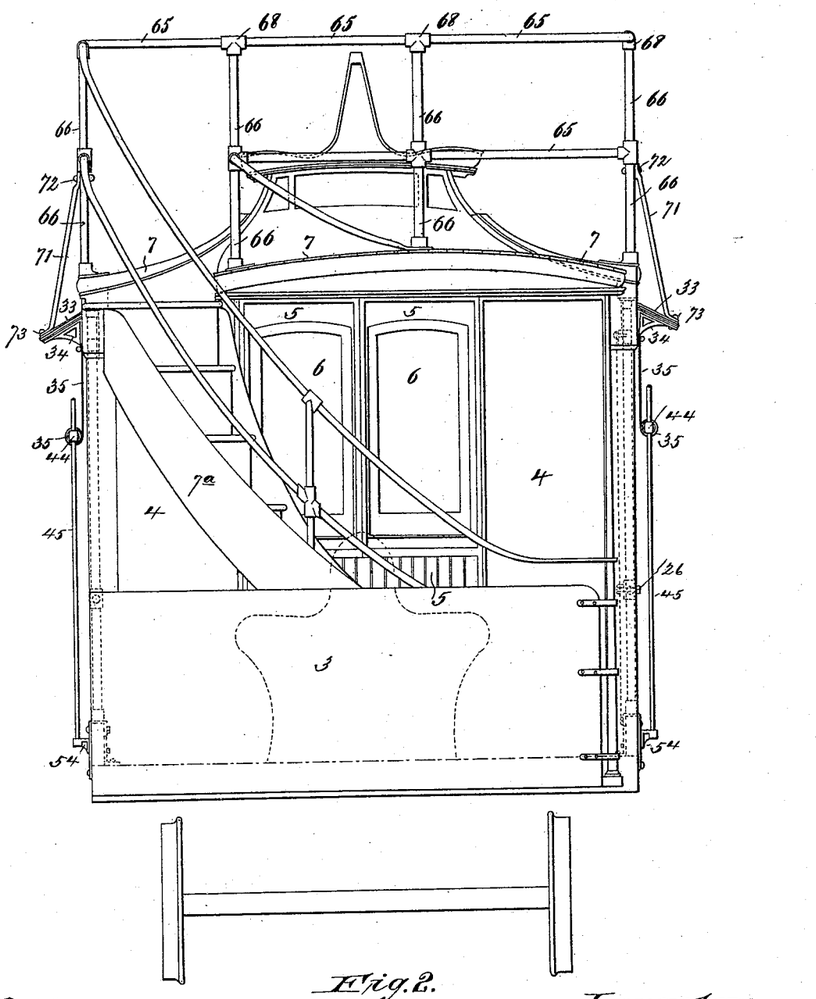
Fig. 2, an enlarged rear elevation of one end of the same.
Figure 3:
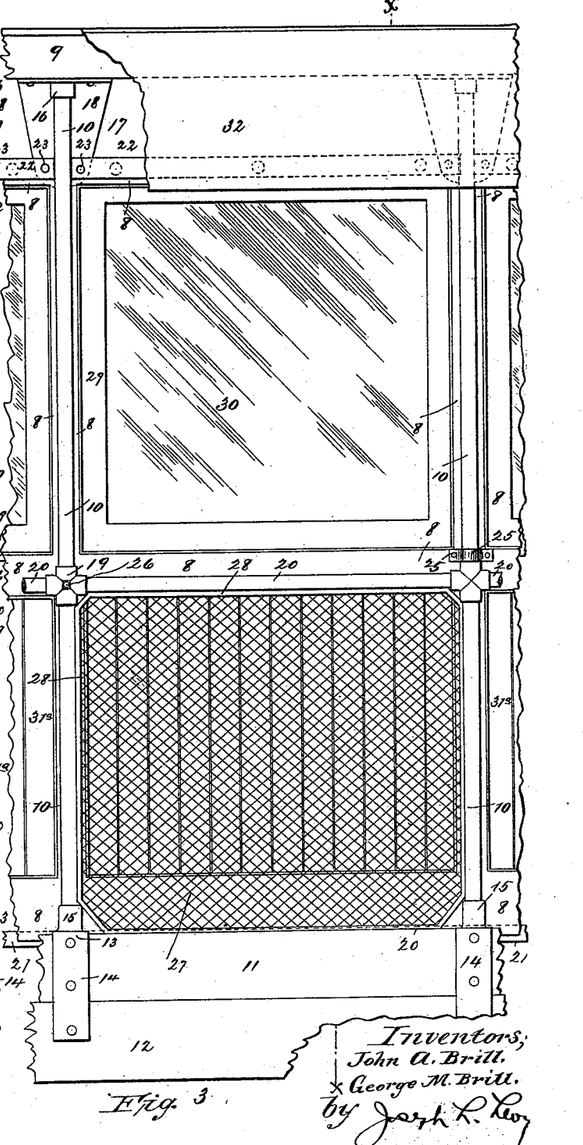
Fig. 3, an enlarged front and side elevation showing a portion of the side of the car, the detachable side secured thereto and the parts to which said detachable side is secured.
Figures 4, 5:
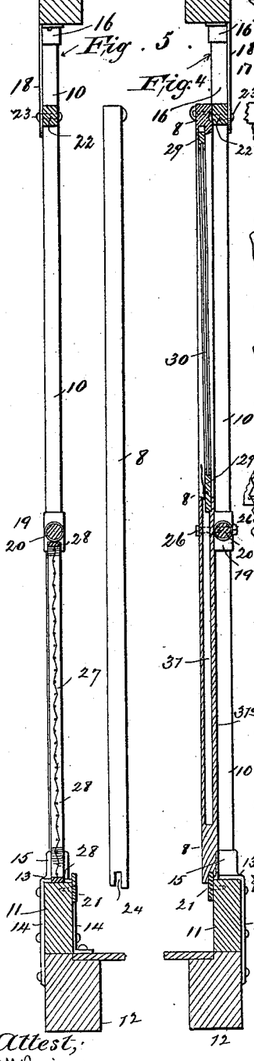
Fig. 4, a perpendicular section taken approximately on the line $x\,x$, Fig. 3, showing the detachable side section secured to the side framing of the car, the detachable screen sections being removed.
Fig. 5, a like view, reversed, showing the side section detached therefrom, and the detachable screen sections secured in place.
Figure 6:
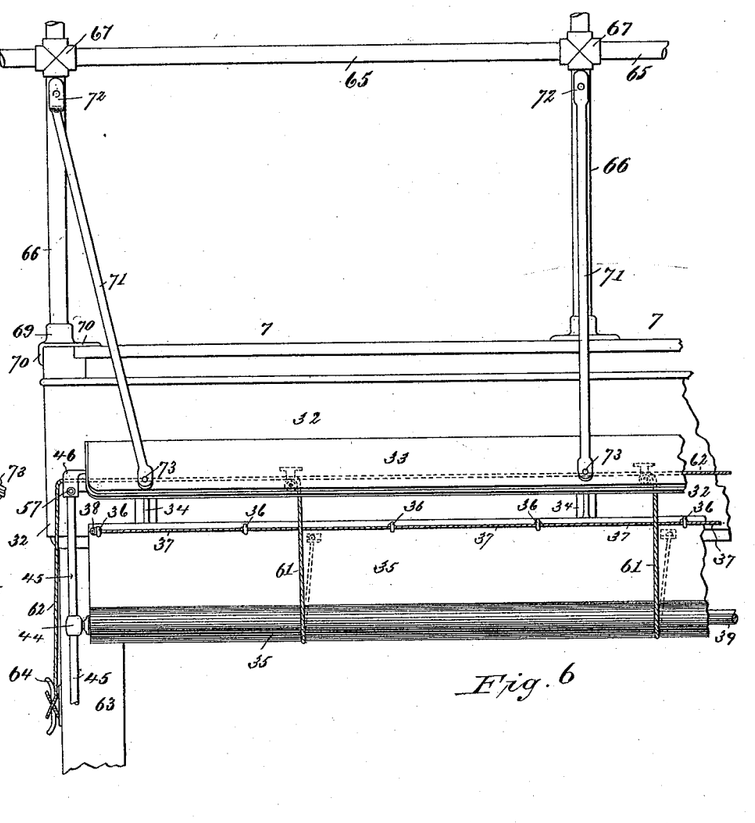
Fig. 6, a side elevation of the upper portion of the car, showing the bracing for the roof, side rails, drip board and side curtain.
Figure 7:
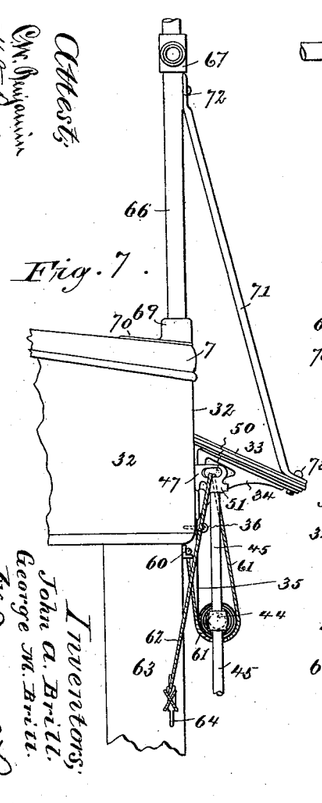
Fig. 7, an end elevation of Fig. 6.

The detachable side 8, which is shown in end elevation in Fig. 5, in section in Fig. 4, enlarged side elevation in Fig. 3, in end elevation by dotted lines in Fig. 2, and side elevation in Fig. 1, is an integral structure adapted to entirely close the side of the car for the full length and height of the opening in the side thereof, which is present when the car is used as an open car, and is adapted both to simulate and take the place of the usual fixed car side.

For use as an open car, a guard rail is provided inclosing the opening, and the upper sill 9 may be supported in any desired manner, but we prefer the herein shown method, as it secures a light, cheap and durable structure, which can be readily assembled and taken apart. This particular structure is shown as comprising the perpendicular stanchions 10, which are secured to the longitudinal truss-planks 11 (which rest on the longitudinal sills 12) by the bed-plates 13, the arms 14 of which are screwed or bolted to either the truss-planks or sill, or to both, the upper portions of the bed plates being provided with a socket 15, into which the lower end of the upright stanchions 10 are either screwed or secured thereto as desired. The upper end of the stanchions 10 pass into sockets 16, which are formed integral with or separate from a bracket 17, the flat top of which is secured to the top sill 9, and which has a depending wing 18. The stanchions are preferably made of tubular piping united together by the elbows 19, the stanchions being united longitudinally by the pipe sections 20, which form hand rails for the side of the car.

For the purpose of securing the detachable side 8 to the car, we attach to the inside of the truss-plank 11, a rail 21, which runs the entire length of the car from end to end of the opening in the side thereof. The rail 21 extends above the top of the truss-plank 11, and is intended to be a permanent fixture thereon. Between the brackets 17 extend the cross bars 22, which are either made continuous in one piece or in sections, and which are secured to the brackets in any desirable manner, they being also a fixture of the car. They may be secured to the brackets by bolts and nuts 23, and may be of either metal or wood, although we prefer to use wood. The detachable side 8 has a rabbet 24 in its lower edge running its entire length, which is adapted to engage with the rail 21, and the detachable side may be adapted to rest on the upper surface of the truss-plank 11, or on the rail 21, or on both as shown in Fig. 4. The upper edge of the detachable side 8 is preferably provided with a series of holes aligning with the cross bars 22, for the purpose of inserting screws or bolts, which form the means for securing the detachable side to the cross bar at its upper portion. If the cross bars are of metal, the bolts may be permanently retained thereon, which should be adapted to pass through the holes in the detachable side aligning therewith, so that by the turning of a few nuts the attachment of the detachable side at this point can be readily secured, and detachment therefrom be as readily accomplished. If the cross bars 22 are of wood, it is only necessary to pass wood screws through the upper portion of the detachable side, through the holes formed therein, and drive the screws home into the cross bars.

For ordinary purposes it would be only necessary to secure the detachable side to the car at the top and bottom thereof, but in order to obtain absolute rigidity between the car and the detachable side, we provide additional means for doing this, two ways being shown in the drawings. One way consists of passing a staple 25 around the stanchions 10 and securing it to the detachable side 8 by ordinary screws. Another way is by forming an aperture through the elbows 19 and passing a bolt 26 through said aperture and through a hole formed in the detachable side, the nut on the bolt being preferably inside and bearing against the detachable side. Of these two methods, both shown in Fig. 3 in side elevation and also in Figs. 1 and 4, we prefer the bolt method, as no prominent part of it is exposed on the exterior of the car.

Between the stanchions 10, rails 20 and truss-blank 11, we secure foot fenders 27 of wire netting held within the frame 28, which frame is intended to be detachably secured within those parts.

Assuming the car to have been used as an open car, and it being desired to change the same from an open to a closed car, the detachable side, (which could have been stored away, say for instance in the car shops) for transforming the cars from open to closed, could be passed into the car, say (when the construction of the same is like that shown in the drawings) through the door-ways 4 and moved up into position for securing the same to the sides thereof. The side would then be lifted over the rail 21, and the rabbet end of the detachable side placed upon the rail. The detachable side could then be secured at its top by the means hereinbefore set forth, and between its top and bottom by either the staple 25 or bolts 26, if their use is found necessary. If the bolts 26 were used, one of them would be amply sufficient, as shown in Fig. 1.

If the car should not have the door-ways 4, an aperture could be formed in the ends and the detachable side passed through, or the rail and cross pieces could be so arranged on the side of the car as to permit the detachable side to be placed in position or detached from the outside.

In order to give the car the appearance of a permanently closed car when the detachable side is secured thereto, window-frames 29, carrying windows 30 may be made a part of the detachable side, and these windows may be permanently secured in position, or adapted to be dropped into a groove 31 cut in the lower portion of the detachable side, to open and close the window in the usual manner. The detachable side may also be provided with panels 31$^a$, but we do not limit ourselves in this regard to either the panels or windows.

One of the objects of the present invention is also to provide an efficient guard to prevent rain from dripping into the inside of the car from the roof platform, and to effect this we secure to the letter or face board (as it is sometimes called) 32 a downwardly projecting dripboard 33 by means of the brackets 34. The drip board is located between the roof platform 7 and the lower edge of the face board, and covers the entire side opening of the car. The drip board may, however, extend below the lower edge of the face board, but we prefer to locate it as shown, so as to bring the curtain when rolled up, (hereinafter described) on a level with or above the lower edge of the face board, as well as to make the braces for the roof hand rails (hereinafter described) as short as possible. The drip board is located so as to prevent expectorations or drippings from the roof falling down into the car.

We are aware that it is not new to make a projection from the side of the car at this point, but this projection, so far as we know, has always been in the nature of an ornamental molding or a portion of the roof of the car, either of which was never intended to be used as a shield or as a platform for bracings extending outwardly from above, and which in fact had but very little extension from the side of the car.

Figure 12:
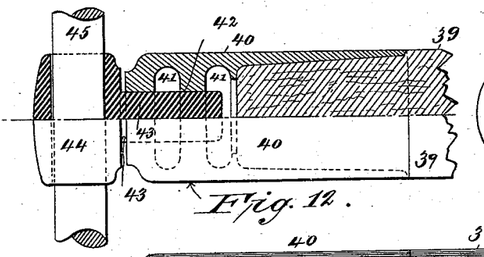
Fig. 12, a side elevation, partly in section, of the end of the curtain pole and the method of securing the same to the side poles.
Figure 13:
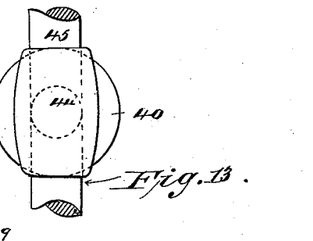
Fig. 13, an end elevation of Fig. 12.
Figure 14:
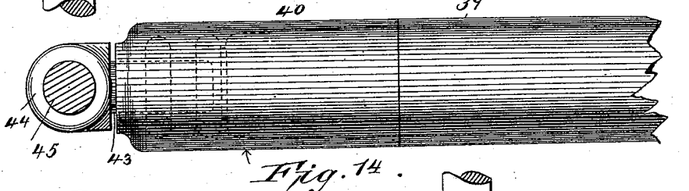
Fig. 14, a plan view of Fig. 12.

Another portion of our present invention is to provide an efficient curtain and means for operating the same, which is intended to be used with an open car and which may be expeditiously raised or lowered, as the exigencies of the occasion may require. The curtain 35 may be of the usual material for curtains, which is generally flexible and water-repellent, and is secured at its upper end to the face board in any desired manner, but the method herein shown is the preferred one, in which we have secured hooks or grommets 36 to the face board, passed the top edge of the curtain over these hooks, and stretched a rope or bar 37 through the hooks and secured the same by knobs or nuts 38 at the end. This forms an efficient method for securing the curtain to the face-board, and enables it to be readily attached or detached. The curtain is secured to the curtain pole 39 at its lower edge in any desired manner, of course such attachment being preferably rigid and permanent. The curtain pole 39 is provided at each end with a hub 40, into which the end of the pole is inserted and secured, as shown in Fig. 12. The outer end of the hub 40 is provided with annular recesses 41 which leave annular rings 42, which provide bearings for a spindle 43 forming part of the apertured sleeve 44, which sleeve embraces the curtain side-posts 45. The hub 40 is adapted to rotate upon the spindle 43, and the sleeve 44 is designed to move up and down on the posts 45. The posts 45 are secured to the car side at each end of the opening in the side thereof, as shown in Fig. 1.

Figures 15, 16, 17:
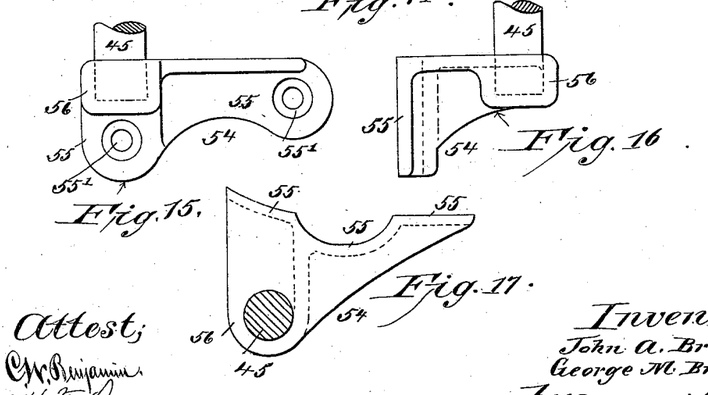
Figs. 15, 16, 17, respectively, a side and end elevation and a plan view of the lower bracket for the curtain side poles.

The means for securing the posts 45 to the side of the car are as follows: At 46 are top side-post brackets having a flat extension 47 provided with holes 48 for the passage of screws, and an outwardly extending boss 49 extending at right angles from the flat section 47, which has at its upper end an eye 50, and a hollow socket 51 provided with an aperture 52, shown in dotted lines, which aperture extends upwardly in the socket near to the eye 50. The socket 51 is provided with an outwardly extending boss 53. The essential portions of the brackets 46 comprise the flat section 47 or its equivalent, by which the bracket is to be secured to the car body, and a socket 51. The reason for this will be shown later on. The lower bracket 54 comprises the web 55 which is made irregular in shape, as shown at Fig. 17, simply for the purpose of fitting snugly against the corner of the car which is rounded. This conformation, however, is not material. The bracket is provided with an outwardly extending arm 56 which is apertured, as shown in dotted lines, into which aperture the curtain post 45 is inserted and in which it rests. Holes 55' are formed in the web 55 for the passage of screws. The only essential portions of this bracket are the apertured extension or arm 56 and the web, by which the said arm can be secured to the car body.

The post 45 is not made as long as the distance between the top of the aperture 52 in the socket 51 and the end of the aperture in the arm 56, so that the brackets do not need to be removed in order to put up or take down the curtain side posts, as such operation can be performed by first putting the side posts in line with the aperture in the socket 51, moving it in the same as far as it will go and then dropping it into the aperture in the arm 56, as shown in Figs. 10, 11, 15 and 16. When the side posts are in position, they can be secured in place by the set screw 57 in the boss 53, which boss is screw threaded to receive the set screw.

It will thus be seen that we provide means for readily attaching and detaching the entire curtain arrangement, all the parts being readily removable, excepting the upper and lower brackets which can be left on the car, both in summer and winter, enabling the curtain to be readily attached and without leaving anything on the car exposed when it is being used as a closed car, to indicate that it has been used as a summer car.

Figure 8:
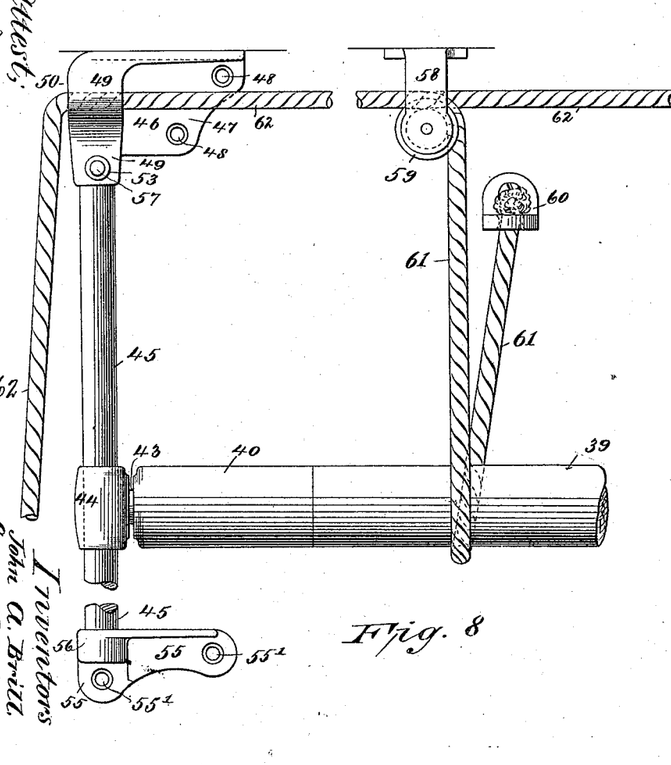
Fig. 8, an enlarged side elevation of the curtain and its operating fixtures.
Figure 9:
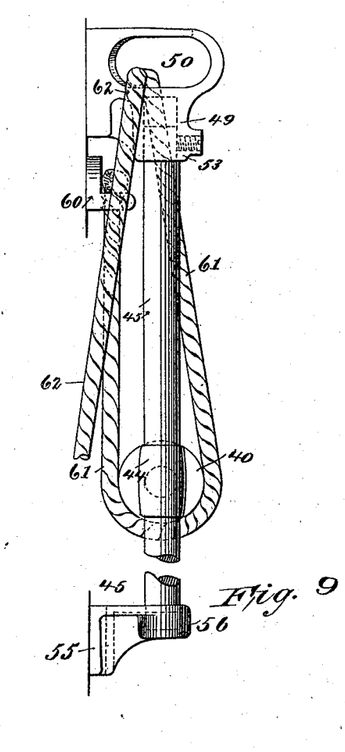
Fig. 9, an end elevation of Fig. 8.
Figure 10:
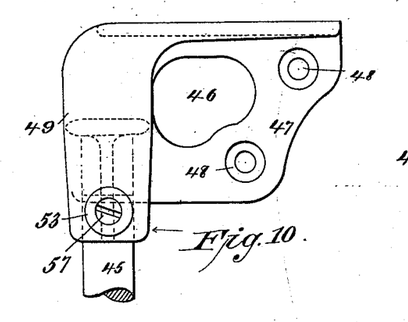
Figs. 10, 11, respectively, side and end elevations of the upper curtain side rail bracket.
Figure 11:
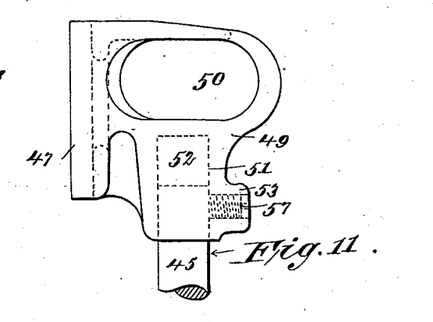

The means for raising the curtain are shown enlarged in Figs. 8 and 9, in which hangers 58 are secured, either to the face board or to the drip-board, and under and within the latter. The hangers are provided with rollers 59 which find bearings in the lower part thereof, and a suitable number of these hangers is located under the drip board, as shown in Fig. 1. A right-angled stud 60 is secured to the face board or other convenient part of the structure and under the curtain, which is apertured and to which is secured by knotting or otherwise, a rope 61, which passes through the aperture in the stud downwardly about the curtain pole and upwardly to the the roller 59. A rope 62 is rove through the hangers 58 and through the eyes 50, the end thereof, (which is farthest removed from the platform 2) passing down from one of the hangers 58 to the curtain about which it passes, and is then secured to one of the studs 60. The platform end of the rope 62 passes downward, and the corner piece 63 of the car is provided with a cleat 64, to which the rope 62 can be secured to hold the curtain in any desired position. The rope 61 is secured in any desired manner to the rope 62, and should be of such length, as will permit the curtain to drop to the lowest point desired, and when the rope 62 is pulled it will move both on the rollers 59 and roll the curtain up, which, unless held by the cleat 64, will descend by the weight of the curtain roll and attachments.

It will thus be seen that we provide efficient means for raising and lowering a comparatively long curtain equally throughout its entire length, thus providing an efficient means for closing the open side of the car when occasion demands it.

The roof platform 7 is inclosed by a hand rail made up of pipe sections, which comprise the longitudinals 65 and the stanchions 66, which are united together by the elbows 67, 68, the stanchions resting in sockets 69 fastened by arms 70 to the platform.

Any form of railing may be used, as our invention relates in this regard to the method of bracing the same, which is accomplished as follows: From the stanchions 66, or other suitable part of the railing we secure diagonally disposed braces 71, the upper portion of which is preferably secured to the stanchions near the elbow 67, as shown at 72, the lower end of which is secured preferably to the outer edge of the drip board 33, as at 73, the drip board in conjunction with the brackets 34 forming an efficient support for the braces.

We do not claim to be the first to have braced a rail or other structure, but consider ourselves to have been the first to have braced the same from without the platform surrounded by the rails, and also to have been the first to have combined a structure like the drip board and its brackets 34, with the diagonal braces 71 for this purpose. The location of the braces 71 without the platform leaves the same free and clear for the movements of passengers thereon; whereas were the braces extended from the platform rail to the platform, they would in order to efficiently brace the same, have to extend inwardly upon the platform and materially interfere with the movements of the passengers thereon.

It is obvious that many changes and modifications in the various embodiments of our invention shown herein may be made, without departing from the spirit thereof.

We do not claim a drip board disposed along the side of the car, extending outwardly therefrom, and above the windows or open side, broadly, as such is shown in the patent to E. C. Sessions, No. 432,954, dated July 22, 1890, but do claim the same with the various combinations into which it enters in the present case.

Having thus described our invention, we claim—

1. The combination with a car body having an opening extending between the platforms thereof, and a side section adapted to be detachably secured to the car to completely close said opening, substantially as described.

2. The combination, with a car body having an open side, of a side section, co-extensive with said open side, adapted to be detachably secured to the car to completely close said side, substantially as described.

3. The combination in a car having an opening extending between the platforms thereof, stanchions extending between the top and bottom of said opening, and a detachable side section adapted to entirely close said opening, substantially as described.

4. The combination, with a car body having an open side, of stanchions extending between the top and bottom of said opening and a side section co-extensive with said open side, adapted to be detachably secured to the car and to the stanchions on the inner side of the stanchions to close said opening, substantially as described.

5. The combination in a car having an opening in the side thereof extending between the platforms, and a detachably secured side section completely closing said opening, said side section containing windows and panel work, substantially as described.

6. The combination, with a car body having an open side, of a side section containing the windows and panel work for said side, co-extensive with said open side, adapted to be detachably secured to the car to completely close said side, substantially as described.

7. The combination with a car having an opening in its side extending between the platforms at both ends thereof, and above the line of the seats within the car, and a detachable side section adapted to be secured to the side of the car to close said opening, which side section is made to simulate a permanent side of a car, substantially as described.

8. In a car having an open side, a rail secured adjacent to the lower edge, and cross bars adjacent to the upper edge, and a side section adapted to engage the rail, and to be detachably secured to the cross-bars, substantially as described.

9. In a car having an open side, stanchions extending between the top and bottom of said opening, cross bars secured to the stanchions adjacent to the top, and a rail located adjacent to the lower edge of said opening, and a side section adapted to engage the rail and be detachably secured to the cross bars, substantially as described.

10. In a car having an open side, a rail secured adjacent to the lower edge, and cross bars adjacent to the upper edge, and a side section having a rabbeted edge for engaging the rail, and detachably secured to the cross bars, substantially as described.

11. In a car having an open side, stanchions extending between the top and bottom of said opening, cross bars secured to the stanchions adjacent to the top, and a rail located adjacent to the lower edge of said opening, and a side section having a rabbeted edge for engaging the rail and detachably secured to the cross bars, substantially as described.

12. The combination with an open sided car of an independent side section and means for detachably securing said section to the car side to close said opening, substantially as described.

13. The combination with a car body having an opening in its side, of a side section, coextensive with said opening, and means for detachably securing the side section to the side from within the car, substantially as described.

14. The combination with an open sided car, of an independent side section, and means for detachably securing said section to the car side to close said opening, said means being located adjacent to the top and bottom of said side section, substantially as described.

15. The combination with an open sided car, of an independent side section, and means for detachably securing said section to the car side to close said opening, said means being located intermediate of the top and bottom of said section, substantially as described.

16. The combination of the winged brackets 17, cross bars 22 secured to wings of the brackets, a rail 21 secured to the longitudinal plank 11, and the independent side section 8 having the rabbet 24 for engagement with the rail, and means for securing the side section to the cross bars, substantially as described.

17. The combination of the stanchions 10, cross bars 22 detachably supported by the stanchions, a rail 21 secured to the longitudinal plank 11, and the independent side section 8 having the rabbet 24 for engagement with the rail, and means for securing the side section to the cross bars, substantially as described.

18. The combination with the stanchion 10, rail 21 and cross bars 22, of the independent side section adapted to engage the rail, a bolt or staple for securing the side section to the stanchion, and screws or bolts for securing it to the cross bars, substantially as described.

19. The combination with an open sided car, of the side section 8 having integral windows 30, and means for detachably securing said section to the car side to close the opening therein, substantially as described.

20. The combination with an open sided car, of the side section 8 having integral windows 30 and panels 31$^a$, and means for detachably securing said section to the car side to close the opening therein, substantially as described.

21. The letter or face board 32 of a car having the brackets 34 secured thereto, and an inclined drip board 33 secured to said brackets, substantially as described.

22. The combination of the roof railing, obliquely disposed braces secured thereto and supported at their lower ends outside of said railing, substantially as described.

23. The combination of the roof railing, a drip board extending out beyond the side of the car, and braces secured to the drip board and to the railing, substantially as described.

24. The combination of the roof railing, a drip-board extending out beyond the side of the car, and braces for the railing obliquely disposed between the railing and drip-board, substantially as described.

25. The combination with the uprights 66 and longitudinals 65, of the inclined drip board 33 secured to the car below the railing by the brackets 34, and a brace 71 extending between the uprights and drip board, substantially as described.

26. A car having an open side between its ends, and a curtain continuous with the opening adapted to be raised or lowered uniformly throughout to open or close said opening, substantially as described.

27. A car having an open side between its ends, and a curtain continuous with the opening, and a drip board secured to the car above the curtain and covering it, substantially as described.

28. The combination, in a car, of a rail on the upper platform thereof, a drip board at the side of the car, brackets supporting said drip board and braces extending between the rail and the drip board, substantially as described.

29. A car having an open side between its ends, side stanchions, a curtain without the stanchions for temporarily closing said opening, and a side section detachably secured within the stanchions for permanently closing said opening, both curtain and section being co-extensive with said open side of the car, substantially as described.

30. The combination of the curtain 35 attached to the car at one end and to the curtain pole 39 at the other, the hubs 40 on the pole, the upright side posts 45, collars 44 adapted to move on the posts, and spindles 43 extending from the collars and upon which the pole and hubs revolve, substantially as described.

31. The combination of the upper and lower curtain side post brackets 46, 54, the bracket 46 having an extended socket, with the side posts 45, adapted to engage both sockets, and shorter than the maximum distance between the supporting and engaging points therefor, substantially as described.

32. The combination of the upper and lower recessed brackets, and the side post 45 shorter than the distance between the recesses and thereby detachable from the brackets, substantially as described.

33. The combination with the curtain pole 39, side posts 45, collars 44 engaging the side posts and curtain pole, a series of ropes 61 secured to the car by the studs 60 and passing round the curtain pole, and the main rope 62 to which each of the ropes 61 is secured, and pulleys 59 supporting the rope 62, substantially as described.

34. The combination with the car having the series of hooks or grommets 36, a curtain 35 the upper edge of which is apertured to pass over the hooks, and a tie rope or bar 37 rove through the hooks outside of the curtain, substantially as described.

35. The curtain side post bracket having a socket for the curtain post and an eye for the curtain rope, substantially as described.

36. The combination of a car body, a curtain attached to the side thereof at a plurality of points, and unitary means for securing or loosening at one operation all the points of attachment, substantially as described.

37. The combination with a car body having its side open the whole length thereof and provided with longitudinal seats, of a side section co-extensive with said open side, adapted to be detachably secured to the car to completely close said side, and an aisle between the side and seats, substantially as described.

38. The combination, in a car, of a curtain adapted to be rolled to the top of the car, and detachable side guide posts for said curtain, substantially as described.

39. The combination, in a car, with a curtain, of a roller therefor, and side posts detachably supported by brackets, substantially as described.

40. The combination, in a car, of a curtain, a curtain pole upon which said curtain is rolled, and side guide posts, with which the ends of the pole engage, substantially as described.

41. The combination, with a car body having an open side, of a curtain secured thereto co-extensive with said opening, and means for raising the lower part of said curtain, while the upper part remains stationary, substantially as described.

42. The combination, in a car, of the longitudinal plank 11, stanchion 10 secured thereto, handrails 20, and foot fender detachably secured between said plank, stanchions, and handrails, substantially as described.

43. The combination of the upper and lower sills, the stanchions secured thereto, the handrails, and the elbows for uniting the stanchions and handrails, substantially as described.

44. The combination, in a car, of the upper and lower sills, stanchions secured thereto, handrails, elbows for uniting the stanchions and handrails, and foot fenders secured between the stanchions and handrails, substantially as described.

45. The combination, in a car, of the upper and lower sills, stanchions secured thereto, handrails, and an independent side section adapted to be detachably secured within the stanchions and handrails, substantially as described.

46. The bracket 19 having an upper flange adapted to be secured on the under surface of the sill 9, the socket 16 for securing the stanchion, and the depending wing 18 for supporting the cross bars, substantially as described.

47. The combination with the side section 8, of the four-way elbow 19, having a central screw-threaded aperture for securing said elbow to said section, substantially as described.

48. The combination of the lower sill 12, the truss plank 11, and the stanchion 10 having bed-plates 13 bolted to said sill and truss plank, substantially as described.

49. The combination of uprights, sleeves sliding thereon provided with spindles or gudgeons projecting at right angles to the uprights, and a shaft or cylinder provided with hubs rotating on said spindles, substantially as described.

Signed at the city of Philadelphia, county of Philadelphia, and State of Pennsylvania, this 27th day of June, 1892.

JOHN A. BRILL.
GEORGE MARTIN BRILL.

Witnesses:
HENRY C. ESLING,
WM. H. HEULINGS, Jr.